Figure 1:
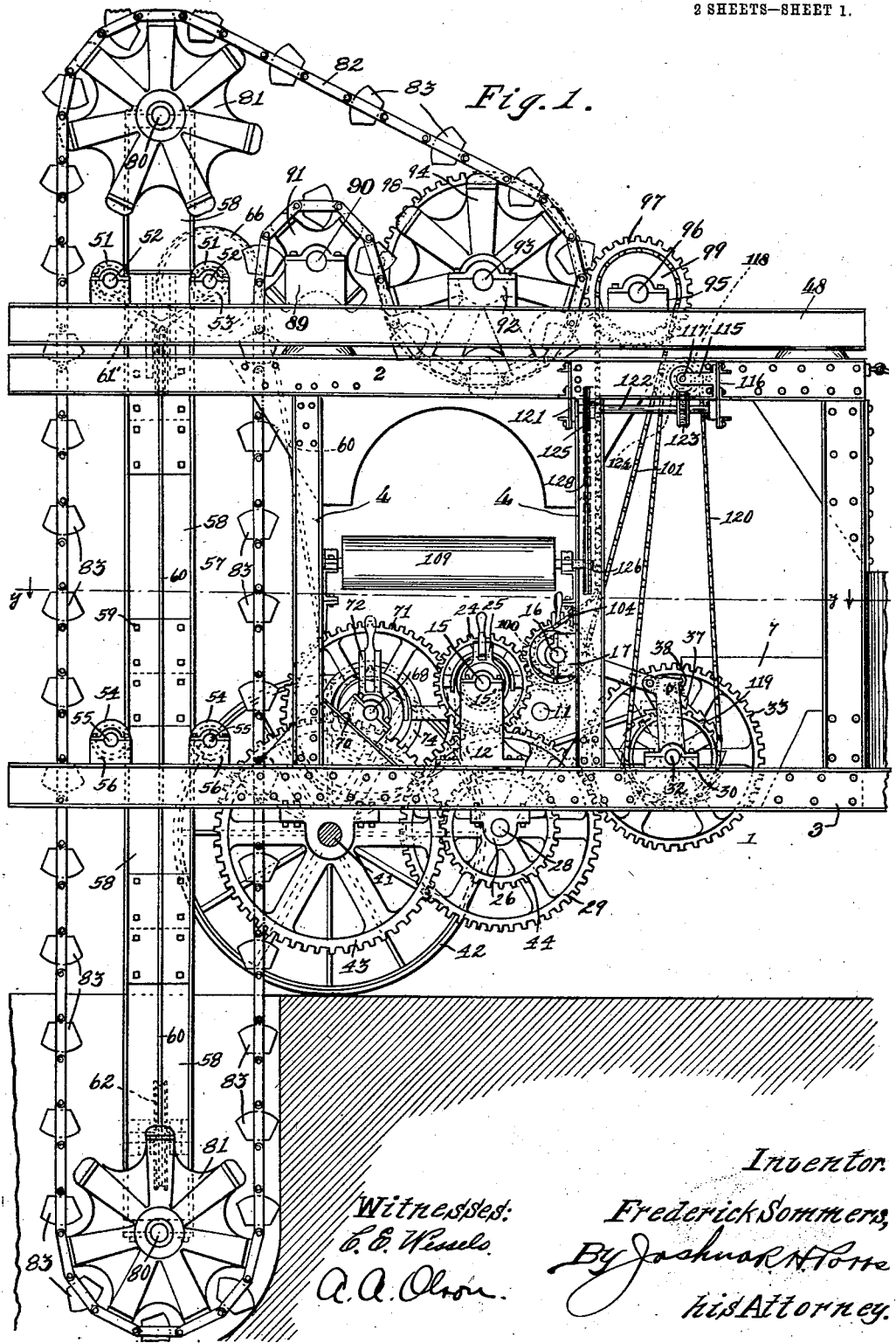

F. SOMMERS.
EXCAVATING MACHINE.
APPLICATION FILED NOV. 15, 1909.

1,015,850.

Patented Jan. 30, 1912.

2 SHEETS—SHEET 1.

Witnesses:
C. E. Wessels.
A. A. Olson.

Inventor.
Frederick Sommers,
By Joshua R. H. Potts
his Attorney.

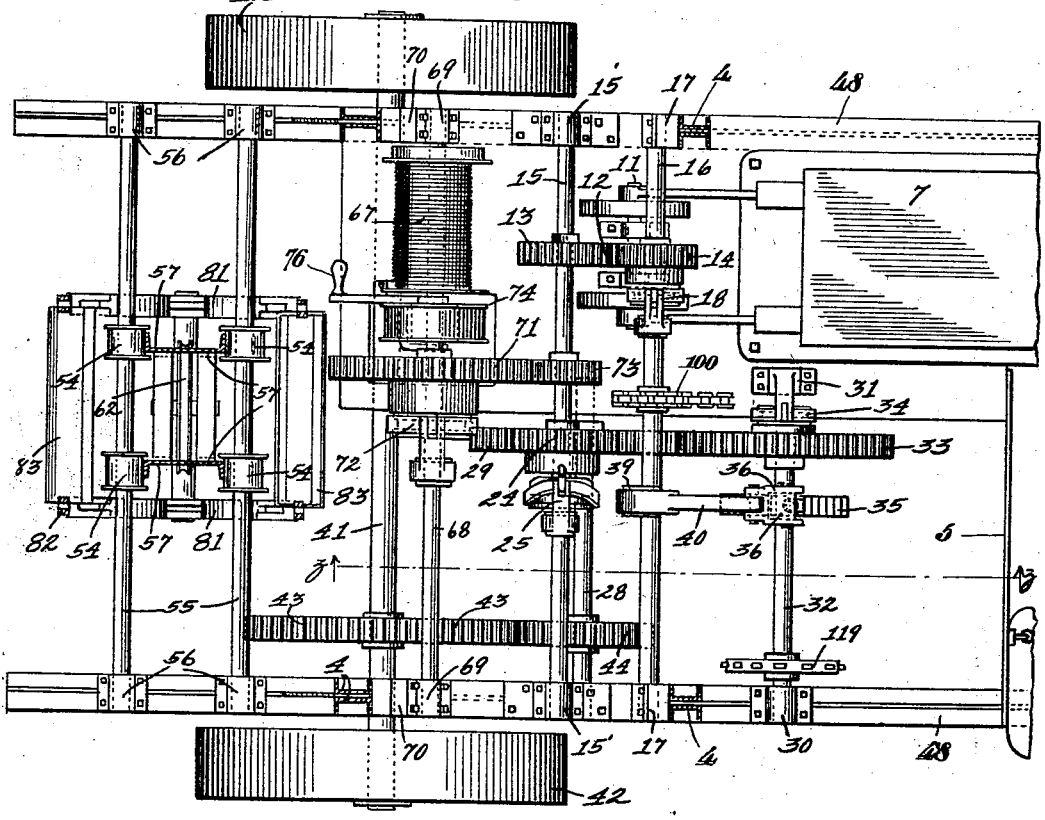

UNITED STATES PATENT OFFICE.

FREDERICK SOMMERS, OF CHICAGO, ILLINOIS, ASSIGNOR OF TWO-EIGHTHS TO ALEXANDER RACZKOWSKI, OF CHICAGO, ILLINOIS.

EXCAVATING-MACHINE.

1,015,850.   Specification of Letters Patent.   Patented Jan. 30, 1912.

Application filed November 15, 1909. Serial No. 528,129.

*To all whom it may concern:*

Be it known that I, FREDERICK SOMMERS, a citizen of the United States, residing at Chicago, county of Cook, and State of Illinois, have invented certain new and useful Improvements in Excavating-Machines, of which the following is a specification.

My invention relates to improvements in excavating machines and has for its object the provision of an excavating machine of simple construction and efficient in operation.

The invention consists in the combinations and arrangements of parts hereinafter described and claimed.

The invention will be best understood by reference to the accompanying drawings forming a part of this specification and in which, Figure 1 is a side elevation of a portion of an excavating machine embodying my invention, and Fig. 2, a top plan view of a portion of the machine corresponding to Fig. 1.

The preferred form of construction as illustrated in the drawing comprises a suitable frame 1 mounted on suitable wheels 42 and carrying a suitable motor 7. The frame comprises upper and lower longitudinally extending channel members 2 and 3 respectively and vertically disposed channel members 4 extending at intervals between the members 2 and 3, said members 2 and 3 being connected by suitable cross members, not shown. A suitable connection with engine 7 is provided to operate the power shaft 11. Carried by the power shaft 11 of the engine 7 is a gear wheel 12. Meshing with said gear wheel are gear wheels 13 and 14, the former being fixed to the shaft 15, whose respective extremities are journaled in bearing brackets 15' mounted upon the frame members 3, and the latter being carried by the shaft 16 whose respective extremities are journaled in bearing brackets 17 also mounted upon the frame. The gear wheel 14 is loosely mounted upon the shaft 16, operative connection therewith being provided through the medium of a manually operable clutch 18. Loosely mounted upon the shaft 15 substantially midway the extremities thereof, is a gear wheel 24, the operative connection thereof with the said shaft being effected through the medium of a clutch 25 similar to clutch 18. Having its respective extremities journaled in bearing brackets 26 on the frame is a counter shaft 28. Affixed to said shaft is a gear wheel 29, meshing with the gear wheel 24 on the shaft 15. Having its respective extremities mounted in bearing brackets 30 and 31 secured to the frame is a shaft 32. Loosely carried upon said shaft is a gear wheel 33 meshing with the gear wheel 29, a clutch 34 similar to clutch 18 being provided to effect an operative connection between said gear and shaft. Affixed to the shaft 32 is a ratchet wheel 35. Embracing the latter, one end of the same being mounted upon the shaft 32 is a U-shaped rocker frame 36 in the outer end of which is carried a pawl 37 normally held in engagement with said ratchet wheel by a compression spring 38. Having its forward extremity connected with frame 36, the rearward end thereof being formed to embrace an eccentric 39 carried by the shaft 16 is a connecting bar 40 by means of which, upon rotation of the shaft 16, oscillatory movement will be imparted to the frame 36; and hence intermittent rotary movement to the shaft 32.

41 indicates the rearward supporting axle of frame 1 and 42 the supporting wheel carried thereby, said wheel being fixed to the shaft 41. Fixed to the shaft 41 intermediate its extremities is a gear wheel 43 meshing with a pinion 44 fixed to the shaft 28.

With the gearing arrangement thus far described, it will be observed that the traction axle 41 may be driven through the initial medium of either the shaft 15 or 16. In the former instance the operative connection with said axle will be effected through the medium of gear wheel 24 clutched to the shaft 15, the gear wheel 29 carried by the shaft 28 which meshes with the gear 24 and the pinion 44 fixed to the shaft 28 which meshes with the gear wheel 43 mounted upon said axle, the latter being in such event evidently driven at a comparatively high rate of speed. This being the gearing arrangement when the machine is being transported and hence when the cessation of the remainder of the mechanism of the device is desired, the clutches 18 and 35 will be thrown out to effect the free movement of the gears 14 and 33 upon their respective shafts 16 and 32, hence the cessation of the mechanism operatively connected with the latter. However, when the machine is in operation, in which event the shaft 16 will serve as the initial medium of transmission, the clutches 18 and 34 will be thrown into operative engagement and the clutch 25 moved to the inoperative position. Upon such adjustment it will be observed, that the operative connection between the engine and the traction axle will be established through the pawl and ratchet connection between the shafts 16 and 32 whereby the latter is, as before stated, only intermittently driven or rotated, it being clear that through such connection the traction axle will be driven and hence the entire device propelled at an extremely low rate of speed.

The vertically disposed supporting frame 57 is comprised of channel irons 58 secured together by fish plates 59 resting in the channels 58 and bolted thereto. The channel irons of frame 57 ride upon flanged rollers 54 mounted upon the shafts 55 mounted in the bearings 56 upon the frame of the machine. A supporting cable 60 is anchored at one end to a Y-shaped hanger 61' suspended from shafts 52 which are mounted in bearings 51 on supplemental frame 48 mounted on the frame of the machine. Cable 60 passes downwardly on one side of the frame 57, then over a grooved pulley 62 at the bottom of said frame, thence upwardly over a grooved pulley 66 and thence to the drum 67 upon which it is coiled. Said drum is fixed to a shaft 68 whose respective extremities are journaled in the bearing blocks 69 supported upon obliquely disposed plates 70, the extremities of which are secured to the frame. From such construction it is evident, that vertical adjustment of the frame 57 may be effected by simply rotating the shaft 68 and hence the drum 67. Loosely mounted upon said shaft is a gear wheel 71 adapted to be locked thereto by a clutch 72 which is similar to clutch 18. Meshing with said gear wheel is a pinion 73 fixed to the shaft 15. By such provision, the rotation as before mentioned, of the shaft 68 in effecting the desired adjustment of the frame 57 may be effected, through a train of gears, by the driving engine 7. However, upon said frame being adjusted to the desired position, the clutch 72 is thrown to disengage gear 71, hence provision must be made to lock the shaft 68 and hence said frame in its adjusted position. In order to effect this purpose I provide the shaft 68, adjacent the drum 69, with a flanged friction wheel 74 rigidly secured thereto. Rockingly secured adjacent to said flanged wheel is a brake lever 76 for this purpose.

Shafts 80 are mounted at the top and bottom of frame 57 and carry sprocket wheels 81, over which a chain 82 is passed. Chain 82 carries digging buckets 83 and passes over sprockets 94 and 91 mounted respectively on the shafts 93 and 90 on the frame of the machine. By this arrangement it will be observed that the frame 57 may be readily extended by inserting new sections 58 and the sprocket chain extended to correspond.

Journaled in the bearing blocks 89 mounted upon the frame 48, slightly forward of the digging bucket supporting frame, is a shaft 90. Mounted for longitudinal adjustment on said shaft in alinement with the sprocket wheels 81 are similar sprocket wheels 91. Having its respective extremities journaled in the bearing blocks 92 mounted on the frame 48 slightly forwardly of the shaft 90 is a shaft 93. Mounted on the latter in a manner similar to the mounting of the sprocket wheels 91 upon the shaft 90, are sprocket wheels 94. Mounted in the bearings 95 secured to the frame 48 forward of the shaft 93, is a shaft 96. Fixed to one extremity of said shaft is a pinion 97 meshing with a gear wheel 98 fixed to the shaft 93. Fixed centrally to the shaft 96 is a sprocket wheel 99 connecting which and a sprocket wheel 100 fixed to the shaft 16, is a sprocket chain 101. With such provision it will be observed that a driving connection is established between the power engine and the shaft 93, and hence between the former and the sprocket wheels 94.

A transverse discharge conveyer 109 is mounted in the frame in position to receive the discharge from buckets 83 and discharge the same from the side of the machine. Having its extremities mounted in bearings provided on the upper frame of the machine and in a bearing block 115 secured to an arm 116 outwardly projecting from the frame, is a transversely extending shaft 117. Fixed to the inner end of said shaft is a sprocket wheel 118 connecting which and a sprocket wheel 119 fixed to the shaft 32, is a sprocket chain 120. Arranged at right angles to said shaft, the respective extremities of the same being mounted in bearings provided in the arm 116 and a similar and similarly supporting arm 121 is a shaft 122. The latter is provided at one extremity with a worm wheel 123 which meshes with a worm 124 provided on the shaft 117, hence an operative connection between said shafts is established. Fixed to the opposite extremity of the shaft 122 is a sprocket wheel 125 extending between and traveling over which and a sprocket wheel 126 fixed to the shaft 107, is a sprocket chain 128.

With the gearing arrangement last described it will be observed that an operative connection between the belt 109 and the driving engine is established by way of the shaft 32, the connection of the latter with the power shaft of the engine having previously been elucidated. Hence when the machine is in operation, the belt 109 will be driven in a direction such as to cause the lateral discharge in one direction from the machine, of the excavations deposited therein from the digging buckets.

Having described my invention what I claim as new and desire to secure by Letters Patent is:

1. An excavating machine comprising a wheeled main frame; a motor mounted on said frame; a vertically adjustable conveyer frame on said main frame, said conveyer frame consisting of sections composed of two channel members secured together and said sections being secured to each other by means of plates bolted in the channels of said channel members; guides on said main frame for said conveyer frame; a longitudinally extensible endless conveyer on said conveyer frame; digging buckets on said conveyer; and operative connections between said motor and the wheels and conveyer, substantially as described.

2. An excavating machine comprising a wheeled main frame; a motor mounted on said frame; a vertically adjustable conveyer frame on said main frame, said conveyer frame consisting of sections composed of two channel members secured together, and said sections being secured to each other by means of plates bolted in the channels of said channel members; flanged guide rollers on said main frame and contacting with the sides of said channel members; a longitudinally extensible endless conveyer on said conveyer frame; digging buckets on said conveyer; and operative connections between said motor and the wheels and conveyer, substantially as described.

In testimony whereof I have signed my name to this specification in the presence of two subscribing witnesses.

FREDERICK SOMMERS.

Witnesses:
JOSHUA R. H. POTTS,
JANET E. HOGAN.

---

Copies of this patent may be obtained for five cents each, by addressing the "Commissioner of Patents, Washington, D. C."